(12) United States Patent
Heudorfer

(10) Patent No.: US 7,204,513 B2
(45) Date of Patent: Apr. 17, 2007

(54) GAS GENERATOR FOR AN OCCUPANT PROTECTION SYSTEM OF A VEHICLE

(75) Inventor: Benedikt Heudorfer, Nersingen (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 0 days.

(21) Appl. No.: 11/251,198

(22) Filed: Oct. 17, 2005

(65) Prior Publication Data

US 2006/0033315 A1 Feb. 16, 2006

Related U.S. Application Data

(63) Continuation of application No. PCT/DE2004/000814, filed on Apr. 14, 2004.

(30) Foreign Application Priority Data

Apr. 17, 2003 (DE) .............................. 103 18 888

(51) Int. Cl.
*B60R 21/26* (2006.01)
(52) U.S. Cl. .................. 280/737; 280/741; 280/742
(58) Field of Classification Search .......... 280/737, 280/736, 741, 742; 137/67, 68.19, 68.21, 137/68.22, 68.23, 68.24, 68.26
See application file for complete search history.

(56) References Cited

U.S. PATENT DOCUMENTS

| | | | | |
|---|---|---|---|---|
| 4,734,265 A | * | 3/1988 | Nilsson et al. | 422/165 |
| 5,356,176 A | * | 10/1994 | Wells | 280/737 |
| 5,564,743 A | * | 10/1996 | Marchant | 280/741 |
| 5,611,567 A | | 3/1997 | Hoo | |
| 5,897,136 A | | 4/1999 | Okada | |
| 6,068,293 A | | 5/2000 | Shirk et al. | |
| 6,086,094 A | | 7/2000 | Stevens et al. | |
| 6,189,926 B1 | | 2/2001 | Smith | |
| 6,206,420 B1 | | 3/2001 | Skanborg et al. | |
| 6,247,725 B1 | | 6/2001 | Möller | |
| 6,752,421 B2 | * | 6/2004 | Khandhadia et al. | 280/741 |
| 6,908,106 B2 | | 6/2005 | Campbell et al. | |
| 2002/0130501 A1 | * | 9/2002 | Nanbu | 280/736 |

FOREIGN PATENT DOCUMENTS

| | | |
|---|---|---|
| DE | 195 31 294 C1 | 8/1996 |
| DE | 195 40 618 A1 | 5/1997 |
| DE | 197 27 047 A1 | 1/1998 |
| DE | 196 31 314 A1 | 2/1998 |
| DE | 197 02 958 A1 | 7/1998 |
| DE | 197 39 375 A1 | 3/1999 |
| DE | 200 10 176 U1 | 12/2000 |
| DE | 199 51 672 A1 | 5/2001 |
| WO | WO 93/21042 | 10/1993 |

* cited by examiner

*Primary Examiner*—Ruth Ilan
*Assistant Examiner*—Tiffany L. Webb
(74) *Attorney, Agent, or Firm*—Foley & Lardner LLP

(57) ABSTRACT

A gas generator for an occupant protection system of a vehicle includes a compressed gas store, first and second bursting devices, and a gas generating triggering device. The compressed gas store has a discharge opening and is configured to store a compressed gas. The first bursting device can close the discharge opening. The triggering device can open the discharge open. The bursting devices can be supported against one another when the compressed gas store is closed, and an increased pressure for bursting a bursting device being able to be built up between the bursting devices by gas generated by the triggering device.

17 Claims, 2 Drawing Sheets

GAS GENERATOR FOR AN OCCUPANT PROTECTION SYSTEM OF A VEHICLE

CROSS-REFERENCE TO RELATED PATENT APPLICATIONS

This is a continuation of International Application PCT/DE2004/000814, which has an international filing date of Apr. 14, 2004 (incorporated by reference herein). The International Application was not published in English, but was published in German as WO 2004/094200 A1 (incorporated by reference herein).

BACKGROUND

The invention relates to a gas generator for an occupant protection system of a vehicle.

Gas generators for occupant protection systems in vehicles are used to fill gas sacks with gas and to inflate them for protecting occupants in the event of an accident. Depending on the region of use of the gas sack, it is desirable for the gas pressure in the gas sack to be maintained over a relatively long period of time, in particular over a number of seconds. This is necessary in particular in the case of gas sacks used for side protection, since an overturning of a vehicle generally lasts for a certain period of time within which the gas sack is to be filled in order to protect the impact of the occupants. Such a long useful life can be achieved with a cold gas generator, in which a cold compressed gas is used as the filling gas. By contrast, the hot gases generated by a pyrotechnic gas generator would lead, due to their rapid cooling, to a similarly rapid drop in pressure within the gas sack.

Cold gas generators generally have a compressed gas store in which the stored compressed gas is stored under high pressure. In order to open the compressed gas store, use is generally made of a pyrotechnic solid explosive charge which can supply a contribution at the same time for filling the gas sack. This then involves what are referred to as hybrid gas generators.

A secure closure of the compressed gas store even in the case of high outside temperatures and a rapid and reliable opening of the compressed gas store in the event of being triggered is essential for the reliable use of these gas generators.

A hybrid gas generator of this type is disclosed, for example, in DE 199 51 672 A1 (hereby incorporated by reference herein in its entirety). A compressed gas store is closed here in a gas-tight manner by a bursting disk. The bursting disk is supported counter to the internal pressure of a container on a supporting device which can be partially destroyed and/or moved by the pressure arising during the combustion of a pyrotechnic solid explosive charge.

SUMMARY

One embodiment of the invention relates to a gas generator for an occupant protection system of a vehicle. The gas generator comprises a compressed gas store, which has a discharge opening and is configured to store a compressed gas; a first bursting device which closes the discharge opening; a second bursting device; and a gas generating triggering device configured to open the discharge opening. The bursting devices being supported against one another when the compressed gas store is closed, and an increased pressure for bursting a bursting device being able to be built up between the bursting devices by gas generated by the triggering device.

Another embodiment of the invention relates to a gas generator for an occupant protection system of a vehicle. The gas generator comprises a compressed gas store, the compressed gas store including a discharge opening and is configured to store a compressed gas; a bursting device which closes the discharge opening; and a triggering device for opening the discharge opening. The bursting device is supported on at least one supporting band when the compressed gas store is closed, and the triggering device acts upon the supporting band in order to burst the bursting device.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
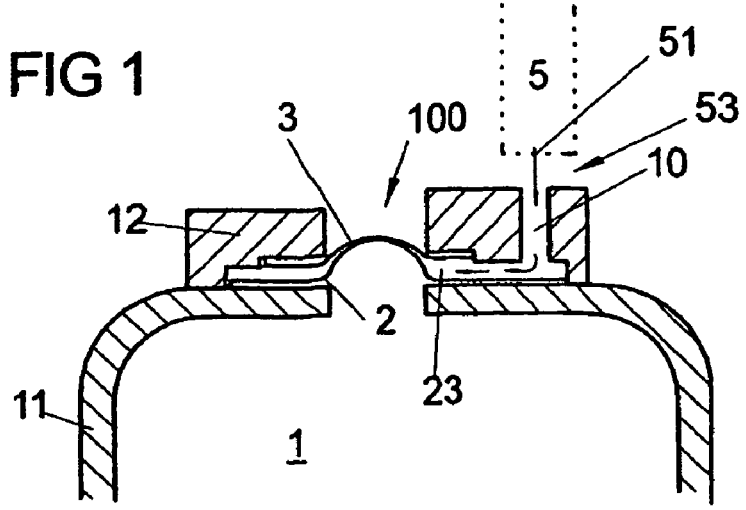
FIG. 1 shows a sectional illustration through a gas generator in the region of the discharge opening of a compressed gas store according to an embodiment of the invention.

It is an object of the present invention to specify an improved gas generator with a compressed gas store, in which the compressed gas store can be securely closed and can be opened with a rapid reaction.

The gas generator, of embodiments of the invention, has a compressed gas store, which has a discharge opening and is intended for storing a compressed gas, the discharge opening being closed by a bursting device and a gas-generating triggering device being provided for opening the discharge opening. According to embodiments of the invention, at least one further bursting device is provided, the bursting devices being supported against one another when the compressed gas store is closed, and, in order to burst a bursting device, an increased pressure being able to be built up between the bursting devices by means of the gas generated by the triggering device.

The basic idea of embodiments of the invention is therefore to close the compressed gas store by means of at least two bursting devices. The bursting devices can be designed in particular as bursting disks or other membranes. By means of a suitable definition of the strength values, in particular by the selection of material, the thickness and geometry of the bursting devices, said bursting devices are designed in such a manner that they can only together withstand the internal pressure of the compressed gas store. As a consequence of this, when a first bursting device is destroyed, the other bursting devices are also destroyed under the internal pressure of the compressed gas store. The destruction of at least one bursting device therefore results in the opening of the compressed gas store.

The destruction of a first bursting device is achieved according to an embodiment of the invention by an increased pressure being able to be built up between the bursting devices by means of the gas generated by the triggering device. The pressure of the gas generated by the triggering device and in addition that part of the internal pressure of the compressed gas store which is transmitted by the inner bursting devices to the outer bursting device therefore act on the outer of the bursting devices. By contrast, the internal pressure of the compressed gas store minus the increased pressure of the gas generated by the triggering device and minus the application of force to the outer bursting devices acts on the inner bursting devices. When a critical pressure built up by the triggering device is reached, the outermost bursting device will therefore burst first. The inner bursting devices, on account of their design, can then no longer withstand the internal pressure of the compressed gas store and likewise burst. The compressed gas store is thus opened. This results firstly in a secure closure of the compressed gas store by the at least two bursting devices and secondly in an efficient and rapid opening of the compressed gas store.

In order to be able to reliably and efficiently build up an increased pressure between at least two bursting devices, a cavity is advantageously formed between the at least two bursting devices, in which cavity an increased pressure can then be built up by means of the gas generated by the triggering device. In order to form the cavity, according to an embodiment, the two bursting devices are supported against one another via a spacer element, since, inter alia, the dimensioning of the cavity can be set in a simple manner via the spacer element.

The gas generated by the triggering device is advantageously conducted between the at least two bursting devices via a gas line. In a cost-effective variant, this gas line is integrated directly in a retaining device retaining the bursting devices. This retaining device can furthermore be integrated directly in the housing of the compressed gas store, so that here, by shaping of the housing of the compressed gas store, the retaining device for the bursting devices and the gas line for conducting the gas generated by the triggering device can be produced at the same time.

A simple assignment of the triggering device to the compressed gas store is achieved by a gas outlet opening of the triggering device being arranged directly opposite the gas line, with it being possible for there to be a gap between the gas outlet opening and the gas line. Since the gas of the triggering device emerges from the gas outlet opening at high velocity, the gas jet thus produced can be aimed directly into the gas line. A direct connection of the gas outlet opening to the gas line is therefore not required. By this means, the installation of the gas generator can be considerably simplified. In a further variant, it is also possible, however, to connect the gas outlet opening to the gas line in a sealing manner.

If the gas of the triggering device is to be used at the same time for filling a gas sack, then it is appropriate to allow the triggering device to flow directly into an antechamber and then to conduct the flow from this antechamber into the gas line. The pressure built up in the antechamber by the triggering device can then continue to be used for filling a gas sack.

A particularly compact structural size of the gas generator is achieved, in a development of the embodiment, by a gas-generating propellant of the triggering device being provided between the bursting devices. The gas-generating propellant may be situated either over the entire region of the discharge opening of the compressed gas store or only in a subregion between the bursting devices. The bursting devices can be supported against one another in particular also via the propellant. In order to be able to achieve the most efficient use possible of the gas produced by the propellant or to be able to use as little propellant as possible, it is appropriate to close the cavity situated between the bursting devices in an essentially gas-tight manner. By means of this embodiment, in which a propellant of the triggering device is situated between the bursting devices, a very compact structural size of the gas generator can be achieved. The structural size is determined essentially only by the expansion of the compressed gas store. The triggering device is then situated essentially in the closure of the discharge opening of the compressed gas store.

The gas generator of an embodiment has a compressed gas store, which has a discharge opening and is intended for storing a compressed gas, the discharge opening being closed by a bursting device and a triggering device for opening the discharge opening being provided. According to the embodiment, the bursting device is supported on at least one supporting band when the compressed gas store is closed, with the triggering device acting upon the supporting band in order to burst the bursting device.

In a first embodiment, the supporting band can be fixed on the gas generator at at least two opposite ends. The triggering device then acts upon the supporting band between the two fixed ends in such a manner that the supporting band is severed by the triggering device. The supporting band can be severed in particular by means of a hot gas jet from the triggering device.

In a second variant embodiment, the supporting band is fixed on the gas generator at one end and in the triggering device at its opposite end. The supporting band in the triggering device can be released from the triggering device in order to open the discharge opening. This can take place, for example, by means of a suitable mechanism.

After the supporting band is severed, the internal pressure of the compressed gas store presses on the bursting device in such a manner that the latter bursts. The bursting device and the supporting band therefore open up the discharge opening of the compressed gas store. In order to achieve secure supporting of the bursting device, the supporting band, in an advantageous refinement, is guided in a slotted-guide mechanism. This slotted-guide mechanism may be integrated, for example, in the retaining device for the bursting device. Secure supporting of the bursting element can be achieved by the supporting band completely covering the bursting element over the entire region of the discharge opening. In a more cost-effective variant, the supporting band only partially covers the bursting device in the region of the discharge opening.

The bursting device is in turn designed in such a manner that it withstands the internal pressure of the compressed gas store only when supported on the supporting band.

The invention is explained in more detail below with reference to the drawings of the figures.

FIG. 1 shows, in a sectional illustration, a cut-out of a gas generator according to an embodiment of the invention. A compressed gas store in the form of a compressed gas cylinder 1 with a housing 11 is filled with a compressed gas which serves, when the gas generator is triggered, to act upon, for example, a gas sack. Provided in the housing 11 of the compressed gas cylinder 1 is a discharge opening 100 from which the compressed gas stored in the compressed gas cylinder 1 can be discharged. This discharge opening is closed by two bursting devices in the form of membranes 2, 3. The two membranes 2, 3 are supported on one another and, in the embodiment shown in FIG. 1, are curved outward by the internal pressure prevailing in the compressed gas cylinder 1.

The two membranes 2, 3 are configured in such a manner that they can only together withstand the internal pressure prevailing in the compressed gas cylinder 1. By contrast, a single one of the two membranes 2, 3 cannot withstand the internal pressure and bursts under the applied pressure. Only by the two membranes 2, 3 being supported against one another can a reliable sealing of the compressed gas cylinder 1 be achieved.

The two membranes 2, 3 are retained in a retaining device 12 which is fastened to the housing 11 of the compressed gas cylinder 1. A gas-tight closure of the interior of the compressed gas cylinder 1 is thus achieved by the two membranes 2, 3, with the actual seal being achieved by the membrane 2 directed in the direction of the interior.

A gas supply line 10 is provided in the retaining device 12 and can be used to conduct a gas generated by a triggering device 5 (indicated diagrammatically) between the two membranes 2, 3. The triggering device 5 has, in particular, a pyrotechnic propellant and is used for triggering the gas generator. Use can be made here, for example, of a known solid gas generator as triggering device 5.

The gas generated in the triggering device 5 escapes via an opening 51 in the triggering device. This opening 51 is arranged opposite the gas line 10, so that the gas flows in a targeted manner into the gas line 10 at a high discharge velocity. In the process, an air gap 53 between the opening 51 and the gas line 10 can also be bridged. Gas line 10 and opening 51 are therefore not closed off by each other in a gas-tight manner.

A gas-tight closure, in which the opening is closed off by the gas line in a directly sealing manner, is provided in a development (not illustrated here) of the embodiment shown in FIG. 1.

An increased pressure can be built up between the two membranes 2, 3 by the gas of the triggering device via the gas line 10. When this pressure reaches a critical level, one of the two membranes 3 bursts, as a result of which the remaining membrane 2 is then acted upon by the full internal pressure of the compressed gas cylinder 1. Under this internal pressure the second membrane 2 also collapses, so that the discharge opening 100 of the compressed gas cylinder 1 is opened.

The opening of the discharge opening 100 is therefore achieved here by a combination of two membranes, which cannot withstand the internal pressure of the compressed gas cylinder on their own, and by the membranes additionally being acted upon by a gas generated by a triggering device. In this case, first of all one of the two membranes 2, 3 is destroyed by the gas provided by the triggering device, whereupon the second membrane also collapses due to the internal pressure prevailing in the compressed gas cylinder 1.

Figure 2:
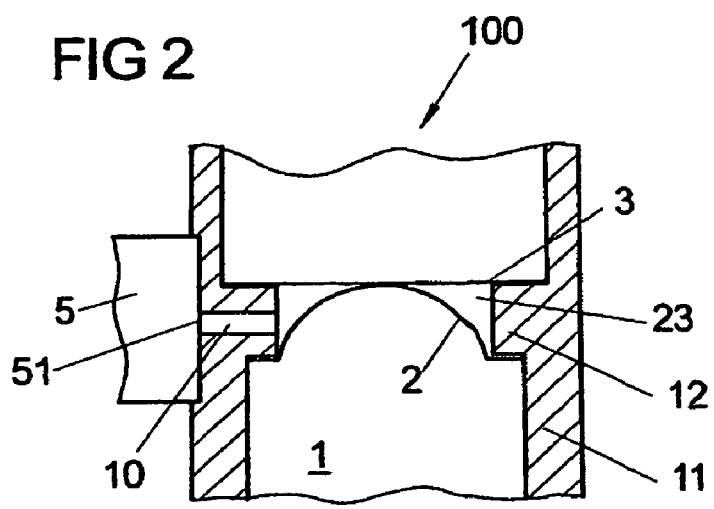
FIG. 2 shows a sectional illustration through a gas generator in the region of the discharge opening of a compressed gas store, the discharge opening being closed by two bursting devices and a cavity being formed between the bursting devices according to an embodiment of the invention.

A development of this principle is shown in FIG. 2. Here, in turn, a compressed gas cylinder 1 is closed by two membranes 2, 3. The inner membrane 2 is retained in such a manner in a retaining device 12, which is integrated in the housing 11 of the compressed gas cylinder 1, that it only comes into contact with the second membrane 3 after a significant curvature. By means of a different configuration of the membranes 2, 3, in particular with respect to their radii, their material and/or their thickness, different curvature structures of one or two membranes 2, 3 can therefore be obtained. Owing to the curvature, a cavity 23 is produced between the two membranes. This cavity is closed in an essentially gas-tight manner and, in the exemplary embodiment shown in FIG. 2, communicates via a gas line 10 with a triggering device 5 which is connected directly to the latter.

The opening of the discharge opening 100 of the compressed gas cylinder 1 is achieved in turn by an increased pressure being built up between the two membranes 2, 3 by the gas generated in the triggering device 5. The gas generated in the triggering device 5 passes via the gas duct 10 into the cavity 23 situated between the two membranes 2, 3. An increased pressure rapidly builds up here and acts both on the outer membrane 3 and on the inner membrane 2. A pressure which is composed of the internal pressure of the compressed gas cylinder 1 minus the pressure built up in the cavity 23—i.e. a reduced pressure—therefore acts on the inner membrane. The increased pressure built up in the cavity 23 by the gas flowing into it plus that part of the internal pressure of the compressed gas cylinder 1 which is transmitted by the membrane 2—i.e. an increased pressure—acts on the outer membrane 3. The outer membrane 3 will therefore usually collapse first. Then, after the cessation of the support by the outer membrane 3, the inner membrane 2 is fully acted upon by the internal pressure acting in the compressed gas cylinder 1 and is therefore likewise destroyed. The discharge opening 100 is therefore opened.

Figure 3:
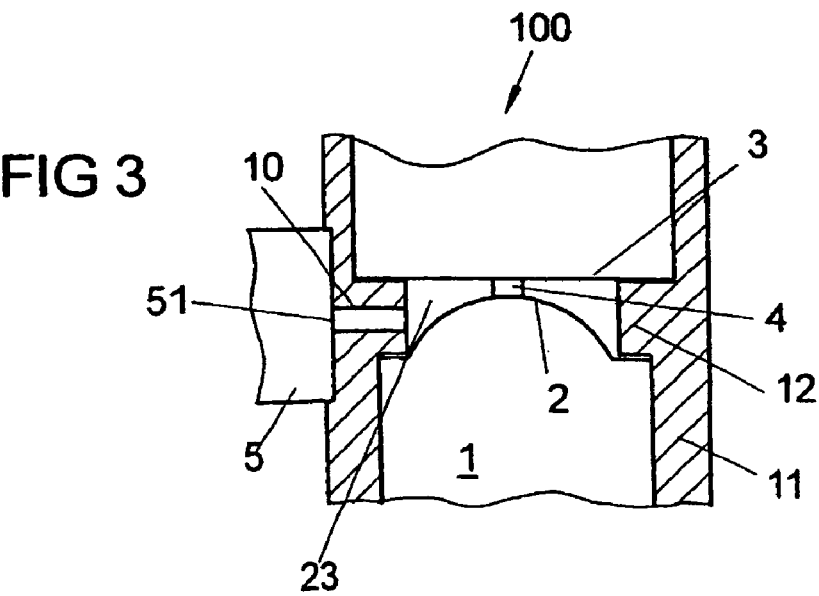
FIG. 3 shows a sectional illustration of a gas generator in the region of the discharge opening of a compressed gas store with two bursting devices which are supported against one another via a spacer element according to an embodiment of the invention.

FIG. 3 shows a development of the embodiment shown in FIG. 2. The two membranes 2, 3 are supported against one another here via spacer element 4 which may be designed, for example, as a spacer disk or spacer ring. As a result, the cavity 23 formed between the two membranes 2, 3 is increased or the curvature of the inner membrane 2 is reduced. The desired volumes for the cavity 23 between the two membranes 2, 3 can thus be set via the dimensioning of the spacer element 4.

Figure 4:
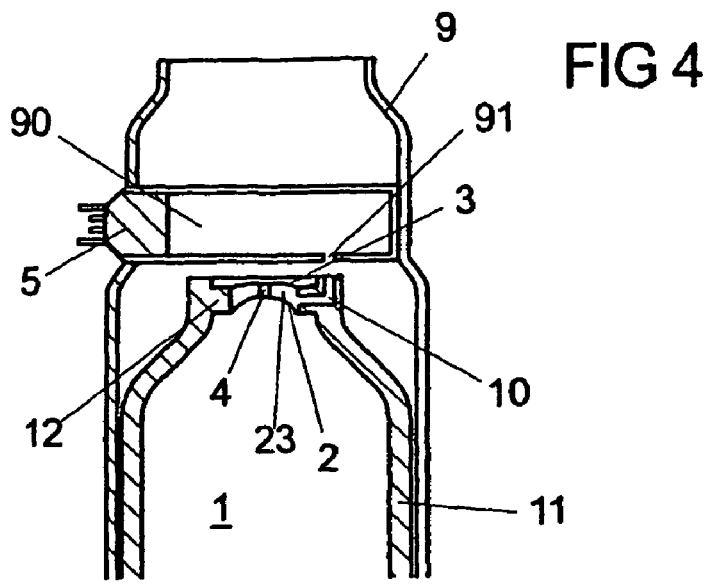
FIG. 4 shows a sectional illustration through a further gas generator in the region of the discharge opening of a compressed gas store, in which gas from a triggering device can flow first of all into an antechamber according to an embodiment of the invention.

FIG. 4 shows a further refinement of a gas generator according to an embodiment of the invention. A compressed gas cylinder 1 is arranged in a housing 9 of the gas generator, with it being possible for the housing 9 to be pulled in a simple manner over the compressed gas cylinder 1. The compressed gas cylinder 1 is in turn closed by two membranes 2, 3 which are supported against one another via a spacer element 4. Gas can flow into the cavity 23 situated between the two membranes 2, 3 via a gas line 10 situated in the housing 11 of the compressed gas cylinder 1.

The housing 9 has a chamber 90 into which the gas generated by the triggering device 5 can flow. Gas generated by the triggering device 5 can flow into the gas line 10 from the chamber 90 via an opening 91 in the chamber 90, which opening is situated opposite the opening of the gas line 10.

In the process, an air gap situated between the opening 91 in the chamber 90 and the gas line 10 is bridged, since the gas flows in a targeted manner out of the opening 91 into the gas line 10 at a high discharge velocity.

The required positive pressure in the cavity 23 between the two membranes 2, 3 is therefore achieved owing to the high discharge velocity of the gas out of the opening 91 of the chamber 90. The membranes 2, 3 are destroyed in the manner already described and the discharge opening 100 of the compressed gas cylinder 1 is opened.

Figure 5:
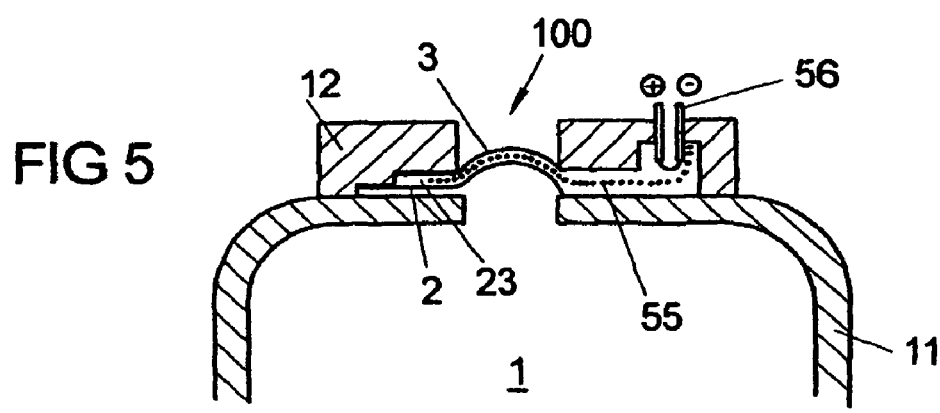
FIG. 5 shows a sectional illustration through a gas generator in the region of the discharge opening of a compressed gas store, with a gas-generating propellant being arranged between two bursting devices according to an embodiment of the invention.

FIG. 5 shows a development of the gas generator according to an embodiment of the invention. The discharge opening 100 in a compressed gas cylinder 1 is in turn closed in a gas-tight manner via two membranes 2, 3. The membranes are in turn retained in a gas-tight manner in a retaining device 12 which is fixed on the housing 11 of the compressed gas cylinder 1. In this embodiment, a propellant 55 of the triggering device is arranged between the two membranes 2, 3. The propellant 55 can extend here either over the entire area between the two membranes 2, 3, or else can extend only in a subregion, in particular a ring, between the two membranes 2, 3.

The two membranes 2, 3 can therefore be supported against one another via a propellant 55 which is designed as a solid body. Igniting contacts 56 are in direct contact with the propellant 55, with the igniting contacts being guided here through the retaining device 12.

In order to open the discharge opening 100, the propellant 55 is now ignited via the igniting contacts 56, as a result of which a gas is produced in the intermediate space 23 between the two membranes 2, 3. This gas builds up an increased pressure in the cavity 23 leading ultimately, according to the known principle, to the destruction of the two membranes 2, 3. The two membranes are also designed here in such a manner that they only together withstand the internal pressure of the compressed gas cylinder 1.

Figure 6:
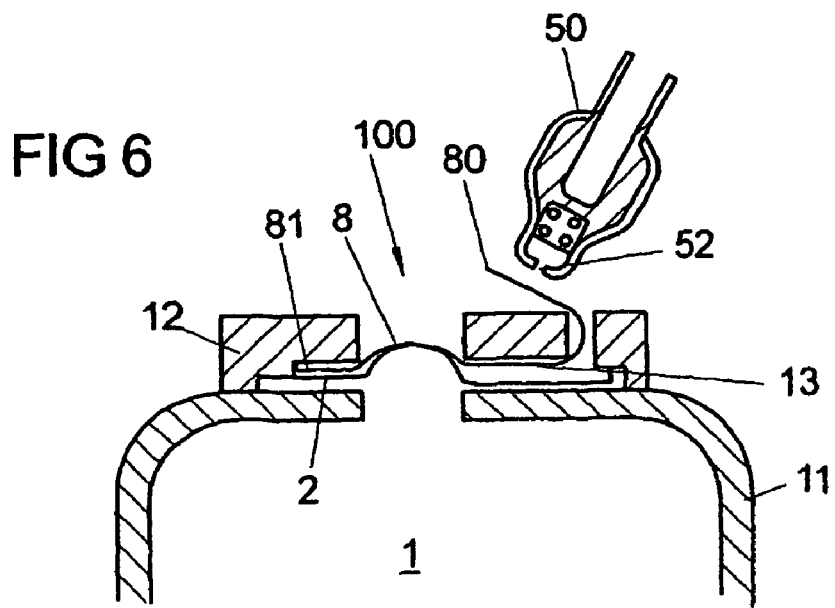
FIG. 6 shows a sectional illustration through a gas generator in the region of the discharge opening of a compressed gas store, with a bursting device being supported here via a supporting band according to an embodiment of the invention.

A development of an embodiment of the invention is shown in FIG. 6. Here, a compressed gas cylinder 1 is closed by a membrane 2 which is connected in a retaining device 12 in a gas-tight manner to the housing 11 of the compressed gas cylinder 1. The membrane 2 in turn is configured in such a manner that it cannot withstand the internal pressure of the compressed gas cylinder 1 on its own. The membrane 2 is therefore supported via a supporting band 8. The supporting band 8 extends here either over the entire area of the discharge opening 100, or else only over a subregion of this area. The supporting of the membrane 2 on the supporting band 8 enables the internal pressure of the compressed gas cylinder 1 to be absorbed.

The supporting band 8 is fixed on the housing of the gas generator at two opposite ends 80, 81 and conducts the forces exerted on the supporting band 8 by the membrane into the housing of the gas generator. The supporting band 8 is guided here in a slotted-guide mechanism 13 which is provided in the retaining device 12. In order to open the discharge opening 100, the supporting band is severed by the triggering device 50. For this purpose, a hot gas jet which emerges from an outlet opening 52 of the triggering device 50 is directed at the supporting band 8.

If the supporting band 8 is severed, it slips out of the slotted-guide mechanism on account of the internal pressure of the compressed gas cylinder 1, with the membrane 2 being acted upon at the same time by the full internal pressure. The membrane 2 is therefore destroyed and the discharge opening 100 opened up.

The German Priority Application 103 18 888.6, filed Apr. 17, 2003, including the specification, drawings, claims and abstract, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A gas generator for an occupant protection system of a vehicle comprising:
   a compressed gas store, which has a discharge opening and is configured to store a compressed gas;
   a first bursting device which closes the discharge opening;
   a second bursting device; and
   a gas generating triggering device configured to open the discharge opening,
   wherein the bursting devices being supported against one another when the compressed gas store is closed, and an increased pressure for bursting the bursting devices being able to be built up between the bursting devices by gas generated by the triggering device.

2. The gas generator as claimed in claim 1, wherein the bursting devices, which are supported against one another, are configured so that the two bursting devices together can withstand the internal pressure from the compressed gas store without rupturing.

3. The gas generator as claimed in claim 1, further comprising a cavity formed between the bursting devices, wherein increased pressure can be built up in the cavity by the gas generated by the triggering device.

4. The gas generator as claimed in claim 3, wherein in order to form the cavity, the bursting devices are supported against one another via a spacer element.

5. The gas generator as claimed in claim 3, wherein the first bursting device has a geometry different from the second bursting device such that a radii of the first bursting device is different from a radii of the second bursting device, and wherein the different geometries of the bursting device form the cavity.

6. The gas generator as claimed claim 3, wherein the cavity is closed in an essentially gas-tight manner and can be acted upon by the gas generated by the triggering device only via a gas supply line.

7. The gas generator as claimed in claim 6, wherein the gas supply line is provided in a retaining device configured to retain the bursting devices.

8. The gas generator as claimed in claim 7, wherein the retaining device is integrally formed with a housing of the compressed gas store.

9. The gas generator as claimed in claim 6, wherein the gas supply line is connected directly to a gas outlet opening of the triggering device.

10. The gas generator as claimed in claim 6, wherein a gas outlet opening of the triggering device is arranged opposite the gas line with a gap through which the gas can escape being present between the gas outlet opening and the gas line.

11. The gas generator as claimed in claim 6, wherein the gas supply line is connected to the triggering device via an antechamber arranged in the housing of the gas generator.

12. The gas generator as claimed in claim 1, further comprising at least one gas-generating propellant of the triggering device, the propellant being arranged between the bursting devices.

13. The gas generator as claimed in claim 12, wherein the bursting devices are supported against one another via the propellant.

14. The gas generator as claimed in claim 12, wherein the cavity situated between the bursting devices is closed in an essentially gas-tight manner.

15. The gas generator as claimed in claim 12, further comprising igniting contacts configured to ignite the propellant, the igniting contacts are guided through a retaining device configured to retain the bursting devices.

16. The gas generator as claimed in claim 1, wherein the bursting devices are formed by destructible membranes.

17. The gas generator as claimed in claim 16, wherein the discharge opening of the compressed gas store is closed in a gas-tight manner by at least one of the membranes.

* * * * *